United States Patent
Bauchot et al.

(10) Patent No.: US 7,933,414 B2
(45) Date of Patent: Apr. 26, 2011

(54) SECURE DATA DISTRIBUTION

(75) Inventors: Frederic Bauchot, Saint-Jeannet (FR);
Francois-Xavier Drouet, La Gaude (FR); Gerard Marmigere, Drap (FR);
Christophe Mialon, Vence (FR)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 11/950,497

(22) Filed: Dec. 5, 2007

(65) Prior Publication Data

US 2008/0152149 A1 Jun. 26, 2008

(30) Foreign Application Priority Data

Dec. 21, 2006 (EP) .................................... 06301281

(51) Int. Cl.
*H04L 9/00* (2006.01)
(52) U.S. Cl. ........................................................ 380/279
(58) Field of Classification Search .................. 713/163, 713/168; 380/279, 28, 30, 44, 45, 47, 280, 380/281, 284
See application file for complete search history.

(56) References Cited

U.S. PATENT DOCUMENTS

| | | | |
|---|---|---|---|
| 6,091,818 A | 7/2000 | Campinos et al. | |
| 6,225,888 B1 * | 5/2001 | Juopperi | 340/5.8 |
| 6,714,649 B1 | 3/2004 | Masuda et al. | |
| RE38,529 E | 6/2004 | Hirose | |
| 6,987,854 B2 | 1/2006 | Maillard | |
| 2001/0055388 A1 | 12/2001 | Kaliski, Jr. | |
| 2003/0161474 A1 * | 8/2003 | Matsuzaki et al. | 380/277 |
| 2005/0123141 A1 | 6/2005 | Suzuki | |
| 2005/0175005 A1 * | 8/2005 | Brown | 370/389 |
| 2006/0204003 A1 * | 9/2006 | Takata et al. | 380/30 |
| 2009/0083190 A1 * | 3/2009 | Isshiki et al. | 705/71 |

FOREIGN PATENT DOCUMENTS

WO 2007042664 A1 4/2007

OTHER PUBLICATIONS

PCT, "Notification of Transmittal of The International Search Report and the Written Opinion of the International Searching Authority, or The Declaration", Date of Mailing, Apr. 21, 2008.
PCT, "International Search Report".
PCT, "Written Opinion of the International Searching Authority".
Balachandran et al., "CRTDH: An Efficient Key Agreement Scheme for Secure Group Communications in Wireless Ad Hoc Networks", 2005 IEEE International Conference in Seoul, Korea, May 16-20, 2005, pp. 1123-1127.
XP-002402752, "802.11i, IEEE Standard for Information Technology- Telecommunications and Information Exchange Between Systems- Local and Metropolitan Area Networks- Specific Requirements", Parts 1, 2, 3 and 4, pp. 1-175, Jul. 23, 2004.

* cited by examiner

*Primary Examiner* — Beemnet W Dada
(74) *Attorney, Agent, or Firm* — Andrea Bauer; Hoffman Warnick LLC

(57) ABSTRACT

Data encrypted with a scrambling key Ks are transmitted from a service provider via a master device to a plurality of client devices having unique identifiers, administered by the master device. A set of partial keys comprising a respective partial key for each respective one of the plurality of clients is calculated at the service provider, by applying a predetermined function to the unique identifiers of all clients but for the identifier of the respective one of the plurality of clients. This set of partial keys is transmitted to the master device, which transmits to each respective clients the respective partial key calculated therefore. Each client can then derive the scrambling key from the respective partial key received from the master device by reference to its own unique identifier, and use the result to decrypt the data.

17 Claims, 4 Drawing Sheets

SECURE DATA DISTRIBUTION

FIELD OF THE INVENTION

The present invention relates to the secure distribution of data to a group of recipients.

BACKGROUND OF THE INVENTION

It is increasingly common for data to be distributed to users from a central source. It is often desirable in such situations to protect the information transmitted in such a way that it can only be used by the intended recipients. Classic examples might include the distribution of "pay TV" video data via radio communications, or more recently over IP networks such as the internet or a cellular telephone network. Several references seeking to address these problems are discussed below.

U.S. Pat. No. 6,714,649 discloses a method and system for broadcasting programs in a network and for blocking illegal access to the broadcast programs. The system comprises a central station and a subscriber terminal. Data of a program to be broadcasted is first scrambled with a scramble key. The scramble key is updated in a short period of time. The scramble key is encrypted with a first key, the first key being assigned to the subscribed terminal. The first key is encrypted with another master key. The master key is set inside the subscriber terminal. After the program is downloaded in the subscriber terminal, the encrypted first key is decrypted by using the master key set in the subscriber terminal. If the program stored in the subscriber terminal is to be executed, the encrypted scramble key is decrypted by using the first key and the scrambled data of the program is unscrambled with the decrypted scramble key. Further like the scramble key, the first key is updated periodically.

U.S. Pat. No. 6,987,854 discloses a method and system for recording encrypted digital data. The system comprises a transmitter, decoder and a portable support device. The digital data is scrambled using a control word. The control word is encrypted with a first key. The scrambled data is transmitted together with the first key-encrypted control word. The first key-encrypted control word is received and decrypted with a decoder that includes an equivalent of the first key. The control word is re-encrypted with a second key which is stored in the portable support device for further secured redistribution. The re-encrypted control word and the scrambled digital data are recorded on a digital recording medium.

U.S. Pat. No. 6,091,818 discloses a method for sending encrypted messages in a conditional access system. The services supplied by a service provider in a conditional access system consist of an item scrambled by control words. The control words are encrypted with an encryption algorithm with a key K and are supplied in messages by which the control words are kept secret. Further, the same message may contain the same control word encrypted several times with a different encryption key. The encryption keys are chosen at random.

U.S. RE 38529 discloses a method of transmitting data through a broadcast system. The method comprises assembling news data and encrypting the news data with a first encryption key. Further, each news data is encrypted with a different first encryption key. The encrypted news data is further encrypted with a common second encryption key. The twice-encrypted news data is then transmitted to a receiver. Upon reception, the twice-encrypted news data is decoded by using second encryption key. As a result the encrypted news data is yielded which is decrypted using the first encryption key used to encode news data prior to transmission.

SUMMARY OF THE INVENTION

The present invention is directed to the transmission of data to a plurality of client devices from a service provider, in such a way to prevent unauthorized use of legally decoded information.

A community of client devices is created, and the client devices may be connected by a common accounting and access right structure, and administered by a common master device. By passing the unique identifiers of a client device to the service provider via the master device, access to the community is effectively controlled.

This approach provides a way of overcoming the capacity problems of wireless networks for mobile phones, since the video signal is transmitted once to the master device and is then repeated with full security to secondary devices on a local basis.

This approach can also ease the transition to and broad adoption of advanced multimedia content services, since only the master device is required to feature the more sophisticated technology enabling the reception of broadcast/streamed content flow. This appears to be even more important as there is currently a lack of consensus on a universal technology standard.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements.

DETAILED DESCRIPTION OF THE INVENTION

While the prior art solutions discussed above may be effective in preventing access to the transmitted data by anyone having access to the transmission medium, it has been appreciated that once a bona fide receiver has rendered the information into a decoded form, the decoded information can then be retransmitted, or otherwise shared in a manner which was not originally intended.

When one considers the domain of Mobile Television for example, it appears that interest in such technology and related service offerings has grown rapidly. Broadcasters and Content Providers hereafter referred to as service providers increasingly deploy Mobile TV for distributing their content on a larger scale, and as new sources of revenues. However, at the moment, there can be only a one-to-one relationship between a mobile Telco operator/service provider and a mobile user/subscriber. One desire of the operator/service provider is to keep the control over the registration process and, of course, over the Content Protection process itself.

There is accordingly proposed a method for cryptographically controlling the retransmission of protected information, for example in the context of multimedia content and services provider. Specifically, content may be broadcast initially over a broadcast or video on demand network to a primary or master device, and then onward, for example over a local network, to registered client devices such as suitably enabled multimedia portable devices, such as cell phones or handheld video players.

More specifically, there is provided a process of registration by a content service provider, of several secondary devices bound to a primary ("master") device. The service provider proceeds then to the dynamic generation of encryption keys required for protecting video signal broadcast or streamed to a master device, which will be responsible in turn to securely re-distribute this video signal, within short range distance, to identified and registered secondary devices. The service provider also addresses the decryption mechanism that every single client device uniquely performs every time this particular authorized device, registered within the identified community of devices, attempts to play back the original multimedia content. This approach relies on the concept of 'community of devices', which become capable of experiencing multimedia access and play out even if they do not directly subscribe to the service, but instead register by the master/primary device.

Figure 1:
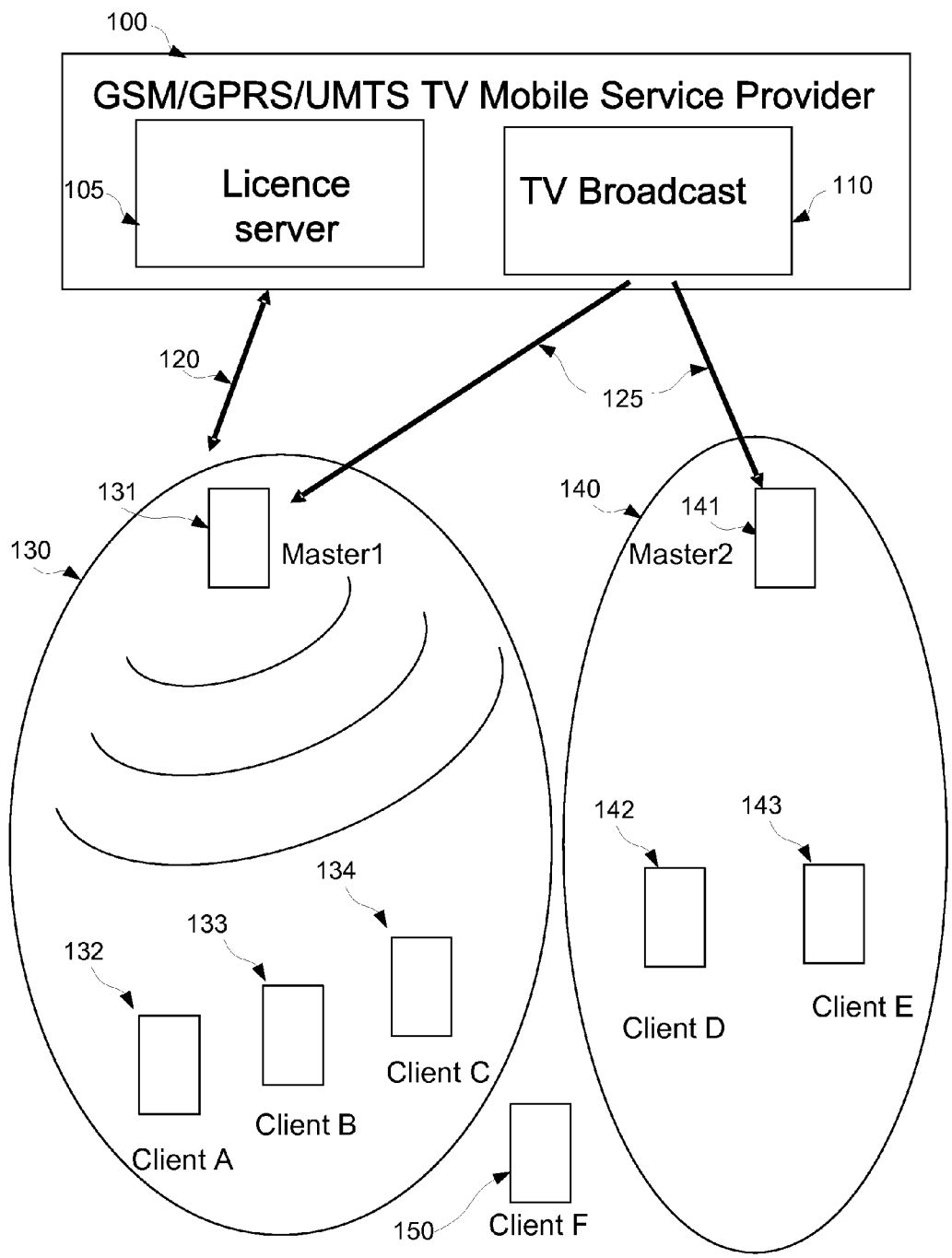
FIG. 1 shows a first embodiment in accordance with the present invention.

FIG. 1 shows a first embodiment of the present invention. As illustrated, there is provided a first master device 131 a second master device 141, and six client devices named "Client A" 132, "Client B" 133, "Client C" 134, "Client D" 142, "Client E" 143 and "Client F" 150. The first master device 131 and "Client A" 132, "Client B" 133 and "Client C" 134, are associated in a first community 130. The second master device 141 and "Client D" 142 and "Client E" 143 are associated in a second community 140. The service provider 100 controls a license server 105 and broadcast source 110. The master device 131 receives an encrypted video signal from a video broadcast source 110 associated with a service provider 100. The master device 131 then redistributes this video signal to each of the client devices belonging in the community 130. One consideration relates to the distribution of an encrypted key in a way that guarantees that only clients having appropriate rights, that is, belonging to the community 130, are able to decrypt the received video signal.

The master devices are the primary devices in any given community, without which no client device can successfully receive data from the service provider, and as such may be seen as administering the community. This need does not however imply that the master device has any control over the membership of the community, although such embodiments are also envisaged as described hereafter. Certain underlying principles will now be discussed.

Hash

A message digest or hash function is an algorithm which takes a variable-length message and produces as output a "fingerprint" or "message digest". Output is a fixed-length hash, 128 bits for MD5 (See: "The MD5 Message-Digest Algorithm" RFC 1321 from R. Rivest), 160 bits for SHA-1 (See "Secure Hash Algorithm 1" RFC 3174). Given the hash, it is computationally all but impossible to find another message with that same hash; in fact one can't determine any usable information about a message from the hash, not even a single bit. The idea is if you compute a message digest, then if any byte in the message changes, the recomputed digest will change and you can detect the tampering when you recompute the hash. If there is no tampering, the digest will remain constant. The hash function is represented by the function Hash(d), where "d" is the data to be hashed.

Encrypt

A cipher or encrypt is an algorithm for performing encryption (and the reverse, decryption)—a series of well-defined steps that can be followed as a procedure. An alternative term is encipherment. The original information is known as plaintext, and the encrypted form as ciphertext. The ciphertext message contains all the information of the plaintext message, but is not in a format readable by a human or computer without the proper mechanism to decrypt it; it should resemble random gibberish to those not intended to read it. The operation of a cipher usually depends on a piece of auxiliary information, called a key (k) or, in traditional NSA parlance, a cryptovariable. The encrypting procedure is varied depending on the key, which changes the detailed operation of the algorithm. A key must be selected before using a cipher to encrypt a message. Without the same key, it should be difficult, if not impossible, to decrypt the resulting ciphertext into readable plaintext. The encryption function is represented by function Encrypt(d,k) where "d" is the data to be encrypted and "k" the encryption key. The decryption function is represented by function Decrypt(d, k).

Rnd

A pseudorandom number generator (PRNG) is an algorithm that generates a sequence of numbers that are not truly random. The outputs of pseudorandom number generators only approximate some of the properties of random numbers. Although truly random numbers are believed to be generatable using hardware random number generators, pseudo-random numbers are important in both the theory and practice of cryptography. The pseudo random number generator is represented by the function PRNG( ).

Scrambling or Stream Cipher

In cryptography, a stream cipher is a symmetric cipher in which the plaintext digits are encrypted one at a time, and in which the transformation of successive digits varies during the encryption. An alternative name is a state cipher, as the encryption of each digit is dependent on the current state. In practice, the digits are typically single bits or bytes. Stream ciphers represent a different approach to symmetric encryption from block ciphers. Block ciphers operate on large blocks of digits with a fixed, unvarying transformation. This distinction is not always clear-cut: some modes of operation use a block cipher primitive in such a way that it then acts effectively as a stream cipher. Stream ciphers typically execute at a higher speed than block ciphers and have lower hardware complexity. National Security Agency documents sometimes use the term combiner-type algorithms, referring to algorithms that use some function to combine a pseudorandom number generator (PRNG) with a plaintext stream. The scrambling function is represented by the function StreamEncrypt(d,k), where "d" is the data to be encrypted and "k" the encryption key. The descrambling function is represented by the function StreamDecrypt(d,k)

Fct

Fct is an associative function of a variable number of arguments $X_j$, defined as:

$$Fct\left(\bigcup_{i=0}^{i=n} X_i\right) = Fct\left(Fct\left(\bigcup_{i=0, i \neq j}^{i=n} X_i\right) \cup X_j\right) \quad \text{(rule 1)}$$

Such functions may be a sum, a product, the Lowest Common Multiple (LCM), or any other function which respects above definition.

LCM

In arithmetic and number theory, the least common multiple or lowest common multiple (lcm) or smallest common of two integers a and b is the smallest positive integer that is a multiple of both a and b. If there is no such positive integer, e.g., if a=0 or b=0, then lcm(a, b) is defined to be zero. The LCM function is represented by the function LCM(d1, d2, . . . , dn).

In embodiments as described hereafter, by means of the above techniques or otherwise, a number of keys and identifiers are defined.

Ks

Ks is a scrambling key. As described hereafter, this key is computed by the service provider and is used to scramble a given channel.

Ku

Ku is a unique key owned both by the service provider and each client device, possibly including the master device. This key is not accessible to software, but only by the descrambling hardware.

DUID

The device unique identifier (DUID) is any piece of data which may be used to uniquely identify a particular client device, from which a number of fixed or variable length which uniquely identifies the device such as the International Mobile Equipment Identity (IMEI) or a part of the device which is in charge of the descrambling such as the Universal Subscriber Identity Module Identity (USIMID) can be derived.

EKs

EKs is an encrypted scrambling key. As described hereafter, the EKs is derived and sent by the service provider to the master device and resent by the master device to the client devices in the community administered thereby. The community of clients is defined by a set of DUIDs identifying respective devices.

Kpe

Encrypted partial keys are calculated by the license server 105 for each community device including the master device. As described hereafter, these keys are sent by the service provider to the master device and resent by the master device to a client device for example when that client joins the community. A community is a set of clients which preferably connect by a short range communication means to a master device in order to receive a data stream. For example, certain client devices may lack the means to receive broadcast information in the form decidable by the master device. A license to decrypt data is applicable only to clients belonging to the community in question. On the other hand, only a community client should be able to decrypt the scrambling key using a personal identification. Each time a client identified by a Device Unique Identifier (DUID) registers or deregisters to a community, the master device provides the service provider with the list of DUID's of all the clients (possibly including itself) forming the community in order to receive a set of new keys. The service provider calculates scrambling keys (Ks as described above) for the data to be transmitted, with a single key being calculated for each separate channel, for use by an entire community. The scrambling key is named Ks and may be a random or pseudo random number which may be changed periodically:

$$Ks = PRNG() \qquad (1)$$

Then the Fct (e.g., least common multiple) of all the unique identifiers of the client devices of the community, plus a random identifier "DUID_R" allocated by the server is calculated to obtain the community key or "Kc". A unique key (Ku) is added to the community key and finally the result is hashed to obtain a fixed length encryption key (KE) which is used to cipher the scrambling key (Ks), thereby generating an encrypted scrambling key (EKs):

$$DUID\_R = PRNG() \qquad (2)$$

$$Kc = Fct\left(\left(\bigcup_{i=0}^{i=n} DUID_i\right) \cup DUID\_R\right) \qquad (3)$$

$$Ke = \text{Hash}(Kc + Ku) \qquad (4)$$

$$EKs = \text{Encrypt}(Ks, Ke) \qquad (5)$$

A set of partial keys (Kpj) is furthermore calculated for each community client. These keys are the Fct (E.g. least common multiple) of all the community client device unique identifiers excluding the identifier of the device to which the key is destined, plus a random identifier applied by the server.

$$Kp_j = Fct\left(\bigcup_{i=0, i \neq j}^{i=n} DUID_i\right) \cup DUID\_R \qquad (6)$$

Then the partial keys are encrypted using the unique key (Ku) to give an encrypted partial key (EKp):

$$EKp_j = \text{Encrypt}(Kp_j, Ku) \qquad (7)$$

all keys EKs, $EKp_0$, $EKp_1$, . . . , $EKp_n$ are returned to the master device. Each Client device m then receives EKs and $EKp_m$ from the master device.

The service provider proceeds to encrypt data using the scrambling key Ks, and transmits the encrypted data to the master device. The master device may then in turn retransmit the signal to the community of client devices.

Figure 2:
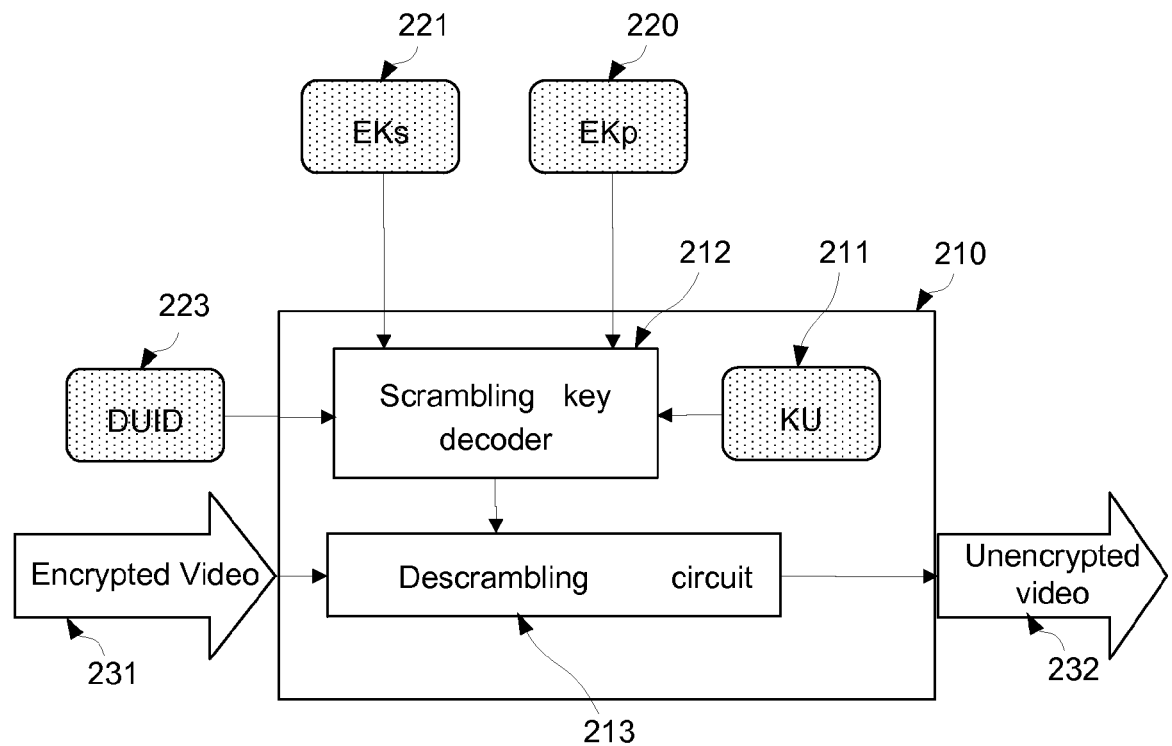
FIG. 2 shows details of the client device of FIG. 1.

FIG. 2 shows details of the client device of FIG. 1. As shown in FIG. 2, a client device as discussed with respect to FIG. 1 comprises decryption means 210 comprising a scrambling key decoder 212 and a descrambling circuit 213. The decryption means 210 also stores the unique key Ku 211 and has access to the DUIDj of the client device j 223. In view of equations 4, 5, 6 and 7, the scrambling key decoder 212 is able to combine the unique key Ku 211 and the client device's DUID 223 with the EKs and $EKp_j$ received from the master device 131 so as to derive a scrambling key corresponding to the original scrambling key used by the service provider to encrypt the data 231. The scrambling key is then passed to the descrambling circuit 213 and used in decrypting the data to generate an unencrypted data stream 232. Clearly, any client device that has not been registered as a member of the community administered by the master device 131 will not be able to successfully decrypt the encrypted data, since its DUID was not used in determining an encrypted partial key, so that the client device will have no valid basis for determining the value of the scrambling key. Accordingly, from the viewpoint of the client device, the following steps are involved in decrypting data from the service provider:

A) The client j receives the key $EKp_j$ from the master equipment.
B) The client j, using its own descrambling unit (which hosts the secret key Ku) decrypts $EKp_j$ to get $Kp_j$ according to the equation (7).
C) The client j computes $Fct(Kp_j, DUID_j)$, which is equal to the community key Kc according to "rule 1" above.
D) The client j feeds its hashing unit with the community key Kc to get Ke according to equation (4).
E) The client j knows now the key Ke, which allows it to decrypt the encrypted scrambling key EKs according to equation (5).

Figure 3:
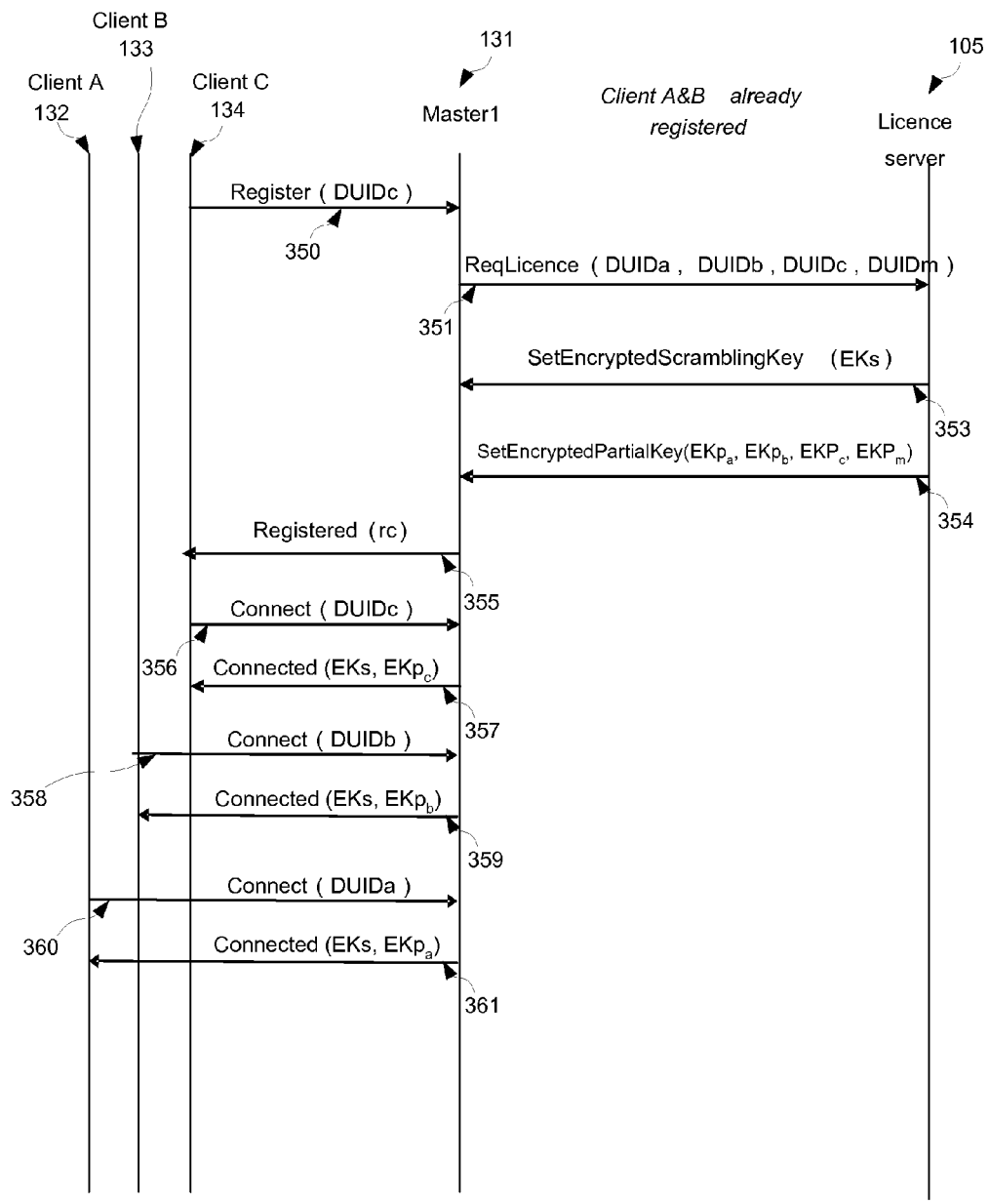
FIG. 3 summarizes the transactions described with respect to FIG. 1.

FIG. 3 summarizes the transactions described with respect to FIG. 1. As shown in FIG. 1, the protocol is initiated by the client C 134 submitting a request 350 to the master 1 131 to register its DUID (DUIDc), the request including the value of the DUIDc. Upon receiving this request, the master 1 131 sends a license request 351 to the license server 105. The license request includes the value of the DUIDc, as well as the values of all other client devices already belonging to the community 130 administered by master 1, i.e., DUIDa, DUIDb, etc. The license server 105 returns the encrypted scrambling key EKs in message 353 and the set of encrypted partial keys $EKp_1, \ldots, EKp_n$ calculated as described above in message 354. The master 1 is then able to inform the client device C that it has been successfully registered in message 355. At some later point, the client C 134 attempts to connect to the data system, once again submitting the value of its DUID (DUIDc) to the master device 131 in a connection request message 356. The master device 131 responds by returning the encrypted scrambling key EKs and the encrypted partial key corresponding to the client in question, i.e., $EKp_c$ in a connection message 357. The client C can then use this information to determine the scrambling key and proceed to decode the data as described with respect to FIG. 2. Should any of the other client devices belonging to the community 130 attempt to decode the data, they will find themselves unable to, since the video is now encrypted using an encryption key calculated as a function of the DUID of the newly added client, client C, as well as their own values. These other clients will therefore also need to go through equivalent steps of connection to receive updated encrypted scrambling key EKs and encrypted partial key values, in messaged 358, 359, 360 and 361. Thereafter, all duly registered and connected members of the community 130 will be able to successfully decrypt the data 231, until a new member joins the community. It may also be envisaged that the license will expire after a certain time where after new values will be determined even if the membership of the community is unchanged. It may also be available to exclude clients from the community who have not reregistered or connected recently, so as to keep the number of DUIDs involved in the calculation of keys to a minimum.

The information sent by the master device to each individual community member is unique, and each member can reconstruct the original common key, based on its own identifier DUID and on the specific information sent by the master device, as a result of the Fct function selected as satisfying "rule 1" above.

Any function "Fct" other than the sum, the product, or the LCM could be used instead, as long as this function "Fct" follows rule 1. For instance such an alternative function can be defined by the following formula:

$$Fct(\{x_i\})_{i=0 \text{ to } n} = \text{Mod}(\Pi(xi)_{i=0 \text{ to } n}, Ku)$$

Figure 4:
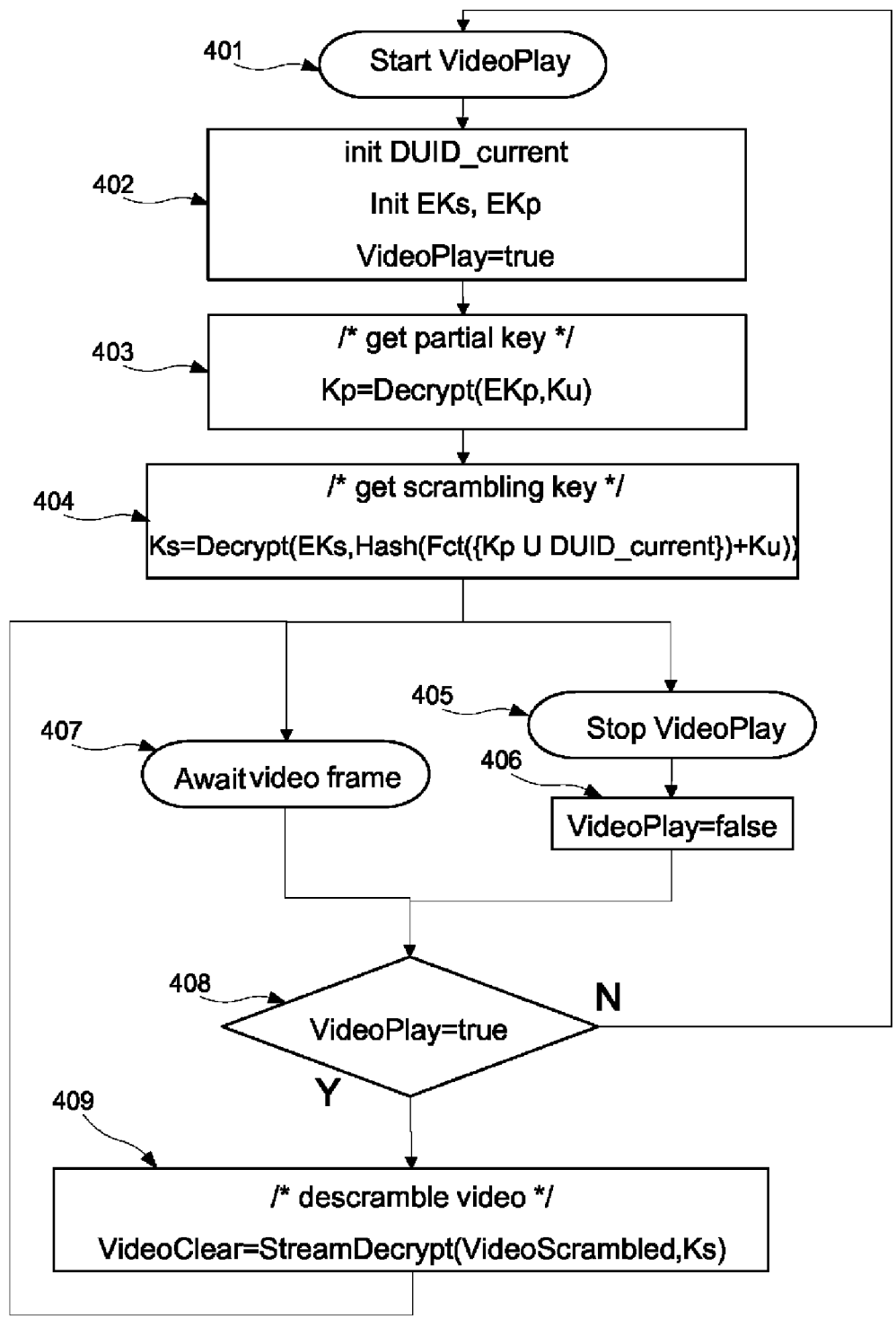
FIG. 4 is a flowchart exemplifying certain aspects of a video data embodiment in accordance with the present invention.

According to certain embodiments, the data encrypted by the server and decoded by the client comprises video data. FIG. 4 is a flowchart exemplifying certain aspects of a video data embodiment. As shown in FIG. 4, the process begins at step 401 where video play is commenced. The process then proceeds to step 402, whereupon the values of the client device's unique identifier DUID and the encrypted scrambling key EKs and the encrypted partial key EKp for the client device in question are loaded. A status variable "VideoPlay" is set to "True", indicating that video playback should proceed.

init DUID_current
init EKs, EKp
VideoPlay=true

The process next proceeds to step 403, which applies the decrypt function as described above to the encrypted partial key EKp, so as to obtain the partial key Kp.

$$Kp = \text{Decrypt}(EKp, Ku)$$

The process then proceeds to step 404 which applies a predetermined function satisfying rule 1 as discussed above to the partial key and the client device's unique identifier. The result is added to Ku and the resulting sum is hashed to obtain the key used to decrypt the encrypted scrambling key. In a nested fashion, these steps can be represented as:

$$Ks = \text{Decrypt}(EKs, \text{Hash}(Fct(\{KpUDUID\_current\}) + Ku))$$

The process now waits for either a video frame to arrive from the service provider at step 407, or for a stop video play command to be received from a user at step 405. In the case where a stop video command is received, the status variable "VideoPlay" is set to "false". In either case, the next step is 408, at which it is determined whether the value of status variable "VideoPlay" is still set to "True". If the value is in fact set to "false", the process returns to step 401, to await reinitiating. If the value is true, the process proceeds to step 409, where the "streamdecrypt" function applies the scrambling key Ks to the scrambled video (VideoScrambled) received from the service provider, thereby deriving unscrambled video data, "VideoClear", as shown in the following expression.

$$VideoClear = \text{Stream Decrypt}(VideoScrambled, Ks)$$

In the context of FIG. 1, it may be imagined that steps 402, 403 and 404 are implemented by the license server 105 under the control of the service provider 100, which also controls the TV broadcast 110, although according to this embodiment the broadcast is continuous and uninterrupted.

Thus according to certain embodiments, data encrypted with a scrambling key Ks are transmitted from a service provider via a master device to a plurality of client devices having unique identifiers, administered by the master device. A set of partial keys comprising a respective partial key for each respective one of the plurality of clients is calculated at the service provider, by applying a predetermined function to the unique identifiers of all clients but for the identifier of the respective one of the plurality of clients. This set of partial keys is transmitted to the master device, which transmits to each respective clients the respective partial key calculated therefore. Each client can then derive the scrambling key from the respective partial key received from the master device by reference to its own unique identifier, and use the result to decrypt the data.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Further steps for the addition of a new client device to the community administered by a master device may be envisaged, for example in terms of prompting a user of the master device in question to confirm that a particular device is authorized to join the community.

A master device may administer a number of communities, which may each comprise different subsets of a plurality of devices.

A master device may also incorporate client device functionality, so that a user of a master device may also access decrypted data thereon.

A client device may belong to a plurality of communities, as administered by different master devices.

A maximum number of members of a particular community may be set by the service provider, or a charge determined based on the number of members registered. In either case, charges for the services provided by the services provider may be borne by an individual associated with the master device. A maximum number of members of a particular community may be set by a user of the master device, at the master device.

Where aspects of the invention are implemented by means of software, this can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Encrypted data and keys may be transmitted over any suitable channel, such as the internet, a private network such as a LAN, WAN, MAN, etc, over a satellite, cable or telephone connection, in a data mode or a voice mode, over a radio link such as a WIFI, Bluetooth, ZIGBEE, cellular telephone network, etc. Any combination of two such channels may be envisaged for respective transmission of data and keys.

The invention may be applied equally to any type of data. The invention may be particularly useful in the context of streaming data sources such as streaming video or audio.

The master device may take any form. In certain embodiments, for example those where the data is video data, it may take the form of a television set top box, a lap top computer, a personal digital assistant (PDA), or a mobile telephone.

The client device may take any form. In certain embodiments, for example those where the data is video data, it may take the form of a television or VDU, a laptop computer, a personal digital assistant (PDA), a mobile telephone or a personal video player.

Both client and master functionality may be integrated in any single device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the embodiments of this invention has been presented for purposes of illustration and description. It is not intended to be exhaustive or to limit the invention to the precise form disclosed, and many modifications and variations are possible.

What is claimed is:

1. A method of transmitting data to a plurality of client devices from a service provider, comprising:
   encrypting the data with a scrambling key Ks at the service provider;
   calculating a set of partial keys comprising a respective partial key for each respective one of the plurality of client devices at the service provider, the respective partial key being calculated by applying a predetermined associative function to unique identifiers of all client devices except for the unique identifier of the respective one of the plurality of client devices;
   transmitting the set of partial keys to a master device; and
   retransmitting to each client device, by the master device, the respective calculated partial key;
   wherein each client device can derive the scrambling key from the respective partial key received from the master device by reference to its own unique identifier, and can use the derived scrambling key to decrypt the encrypted data;
   and wherein the predetermined associative function satisfies for n unique identifiers X:

$$Fct\left(\bigcup_{i=0}^{i=n} X_i\right) = Fct\left(Fct\left(\bigcup_{i=0, i \neq j}^{i=n} X_i\right) \cup X_j\right).$$

2. The method of claim 1 wherein, prior to the calculating, receiving a respective unique identifier (DUIDj) from each of the plurality of client devices as relayed by the master device.

3. The method of claim 1, wherein calculating and transmitting the set of partial keys further comprises:
   calculating a community key Kc as a function of the unique identifiers;
   calculating a fixed length encryption key by hashing together the community key Kc and a secret key Ku;
   using the fixed length encryption key to encrypt the scrambling key, thereby producing an encrypted scrambling key (EKs);
   calculating a respective partial key ($Kp_j$) for each respective one of the plurality of client devices, wherein for each the respective one of the plurality of client devices, the partial key comprises the predetermined associative function of all unique identifiers submitted by the master device but for the identifier of the respective one of the plurality of client devices;

calculating an encrypted partial key (EKp) by encrypting the partial keys Kp with the secret key (Ku) to give an encrypted partial key (EKp); and sending all encrypted partial keys (EKp) from the service provider to the master device;

wherein each client device can derive the scrambling key by:

decrypting the respective encrypted partial key (EKp$_j$) with reference to the secret key (Ku) to obtain the respective partial key (Kp$_j$);

applying the predetermined associative function to the encrypted partial key for the respective client device (EKp$_j$) and the unique identifier for the respective client device (DUID$_j$), thereby deriving the community key (Kc);

hashing together the community key (Kc) and the secret key (Ku) to obtain the encryption key (Ke); and decrypting the encrypted scrambling key (EKs), thereby obtaining the scrambling key (Ks).

4. The method of claim 1, wherein the respective unique identifier is received from each client device via the master device at the service provider prior to encrypting the data with a scrambling key Ks at the service provider.

5. The method of claim 4, wherein only unique identifiers corresponding to client devices that are authorized to join the community are received at the service provider.

6. The method of claim 5 wherein determining whether the respective client device is authorized to join the community comprises prompting a user of the master device to confirm that a particular client device is authorized to join the community.

7. The method of claim 1, wherein the master device administers a number of communities, which may each comprise different subsets of a plurality of client devices.

8. The method of claim 1, wherein the predetermined associative function is any one of a sum, a product or a lowest common multiple.

9. The method of claim 1, wherein the master device and at least one of the plurality of client devices functionality are implemented on a same physical device.

10. The method of claim 1, wherein a client device belongs to a plurality of communities, as administered by different master devices.

11. The method of claim 1, wherein a maximum number of members of a particular community may be set by the service provider.

12. The method of claim 1, wherein a charge determined based on the number of members registered is levied by the service provider.

13. The method of claim 1, wherein a maximum number of members of a particular community may be set by a user of the master device, at the master device.

14. A method of receiving data at a client device, comprising:

submitting a unique identifier (DUID$_j$) for the client device for use in calculating at a service provider a set of partial keys comprising a respective partial key for each of a plurality of client devices including the client device, the respective partial key being calculated by applying a predetermined associative function to the unique identifiers of all client devices except for the identifier of the respective one of the plurality of client devices;

receiving a respective partial key corresponding to the client device via a master device;

deriving the scrambling key from the respective partial key received from the master device by reference to the unique identifier of the client device;

receiving data encrypted with a scrambling key Ks at the service provider; and using the scrambling key to decrypt the encrypted data;

wherein the predetermined associative function satisfies for n unique identifiers X:

$$Fct\left(\bigcup_{i=0}^{i=n} X_i\right) = Fct\left(Fct\left(\bigcup_{i=0, i\neq j}^{i=n} X_i\right) \cup X_j\right).$$

15. The method of claim 14, wherein the partial keys are calculated by:

calculating a community key Kc as a function of the unique identifiers;

calculating a fixed length encryption key by hashing together the community key Kc and a secret key Ku;

using the resulting fixed length encryption key to encrypt the scrambling key, thereby producing an encrypted scrambling key (EKs);

calculating a respective partial key (Kp$_j$) for each respective one of the plurality of client devices, wherein for each the respective one of the plurality of client devices, the partial key comprises the predetermined associative function of all unique identifiers submitted by the master device except for the identifier of the respective one of the plurality of client devices;

calculating an encrypted partial key (EKp) by encrypting the partial keys Kp with the secret key (Ku) to give an encrypted partial key (EKp);

and sending all encrypted partial keys from the service provider to the master device;

wherein the client device derives the scrambling key by;

decrypting the respective encrypted partial key (EKp$_j$) with reference to the secret key (Ku) to obtain the respective partial key (Kp$_j$);

applying the predetermined associative function to the encrypted partial key for the respective client device (EKp$_j$) and the unique identifier for the respective client device (DUID$_j$), thereby deriving the community key (Kc);

hashing together the community key (Kc) and the secret key (Ku) to obtain the encryption key (Ke); and decrypting the encrypted scrambling key (EKs), thereby obtaining the scrambling key (Ks).

16. A program product stored on a non-transitory computer readable medium, which when executed, transmits data to a plurality of client devices from a service provider, the computer readable medium comprising program code for:

encrypting the data with a scrambling key Ks at the service provider;

calculating a set of partial keys comprising a respective partial key for each respective one of the plurality of client devices at the service provider, the respective partial key being calculated by applying a predetermined associative function to unique identifiers of all client devices except for the unique identifier of the respective one of the plurality of client devices;

transmitting the set of partial keys to a master device; and retransmitting to each client device, by the master device, the respective calculated partial key;

wherein each client device can derive the scrambling key from the respective partial key received from the master device by reference to its own unique identifier, and can use the derived scrambling key to decrypt the encrypted data;

wherein the predetermined associative function satisfies for n unique identifiers X:

$$Fct\left(\bigcup_{i=0}^{i=n} X_i\right) = Fct\left(Fct\left(\bigcup_{i=0, i\neq j}^{i=n} X_i\right) \cup X_j\right).$$

17. A system for transmitting data to a plurality of client devices from a service provider, comprising:
   at least one computer, including:
   a system for encrypting the data with a scrambling key Ks at the service provider;
   a system for calculating a set of partial keys comprising a respective partial key for each respective one of the plurality of client devices at the service provider, the respective partial key being calculated by applying a predetermined associative function to unique identifiers of all client devices except for the unique identifier of the respective one of the plurality of client devices;
   a system for transmitting the set of partial keys to a master device; and
   a system for retransmitting to each client device, by the master device, the respective calculated partial key;
   wherein each client device can derive the scrambling key from the respective partial key received from the master device by reference to its own unique identifier, and can use the derived scrambling key to decrypt the encrypted data;
   wherein the predetermined associative function satisfies for n unique identifiers X:

$$Fct\left(\bigcup_{i=0}^{i=n} X_i\right) = Fct\left(Fct\left(\bigcup_{i=0, i\neq j}^{i=n} X_i\right) \cup X_j\right).$$

* * * * *